(12) United States Patent
Uhlik et al.

(10) Patent No.: US 6,532,770 B2
(45) Date of Patent: Mar. 18, 2003

(54) METHODS OF PREPARING GLASS SUBSTRATES FOR MAGNETIC MEDIA

(75) Inventors: James M. Uhlik, Clarks Summit, PA (US); Adam O'Ryan, Mountaintop, PA (US); Horst Loch, Niederhausen (DE); Holger Wegener, Alfeld (DE)

(73) Assignee: Schott Glass Technologies, Inc., Duryea, PA (US)

( * ) Notice: Subject to any disclaimer, the term of this patent is extended or adjusted under 35 U.S.C. 154(b) by 0 days.

(21) Appl. No.: 09/861,672

(22) Filed: May 22, 2001

(65) Prior Publication Data

US 2001/0038929 A1 Nov. 8, 2001

Related U.S. Application Data

(62) Division of application No. 09/477,712, filed on Jan. 5, 2000, now abandoned.

(51) Int. Cl.⁷ ............................................. C03B 17/06
(52) U.S. Cl. ............................ 65/97; 65/105; 428/65.3
(58) Field of Search ........................ 65/60.4, 61, 92, 65/97, 105; 428/65.3

(56) References Cited

U.S. PATENT DOCUMENTS

| | | | |
|---|---|---|---|
| 3,338,696 A | | 8/1967 | Dockerty |
| 3,682,609 A | | 8/1972 | Dockerty |
| 4,148,661 A | | 4/1979 | Kerko et al. |
| 4,824,808 A | * | 4/1989 | Dumbaugh, Jr. ............ 501/66 |
| 4,943,957 A | | 7/1990 | Sato et al. |
| 4,945,432 A | | 7/1990 | Matsudaira et al. |
| 5,029,027 A | | 7/1991 | Sleger |
| 5,100,452 A | * | 3/1992 | Dumbaugh, Jr. ............ 156/155 |
| 5,116,787 A | * | 5/1992 | Dumbaugh, Jr. ............ 349/158 |
| 5,278,709 A | | 1/1994 | Thornton et al. |
| 5,342,426 A | * | 8/1994 | Dumbaugh, Jr. ............ 216/97 |
| 5,427,867 A | | 6/1995 | Kogure et al. |
| 5,532,889 A | | 7/1996 | Stefansky et al. |
| 5,534,321 A | | 7/1996 | Alpha et al. |
| 5,622,904 A | | 4/1997 | Ohkubo et al. |
| 5,691,256 A | | 11/1997 | Taguchi et al. |
| 5,721,181 A | | 2/1998 | Sehgal et al. |
| 5,725,625 A | | 3/1998 | Kitayama et al. |
| 5,726,108 A | | 3/1998 | Taguchi et al. |
| 5,741,745 A | | 4/1998 | Sehgal et al. |
| 5,744,208 A | | 4/1998 | Beall et al. |
| 5,780,371 A | | 7/1998 | Rifqi et al. |
| 5,788,731 A | | 8/1998 | Suzuki et al. |
| 5,981,015 A | | 11/1999 | Zou et al. |
| 6,063,470 A | | 5/2000 | Zou et al. |
| 6,174,827 B1 | | 1/2001 | Goto et al. |
| 6,191,058 B1 | | 2/2001 | Yamaguchi |

OTHER PUBLICATIONS

D. Boettger, "Flat Panel Display Substrates", Glass Technology International Apr. 1988, pp. 351–356.

* cited by examiner

Primary Examiner—Sean Vincent
(74) Attorney, Agent, or Firm—Millen, White, Zelano & Branigan, P.C.

(57) ABSTRACT

Described are substrates for magnetic media which have excellent surface properties as prepared directly from a slot drawdown glass sheet forming process. The substrate blanks cut directly from the glass sheet, as drawn, require little or no surface treatment for use as substrates for magnetic media, particularly hard disk drives. Also described are methods for preparing such substrates and methods for preparing magnetic media therefrom. Further described are the substrates and magnetic media prepared by such processes.

16 Claims, 3 Drawing Sheets

P = Sori + W + R

METHODS OF PREPARING GLASS SUBSTRATES FOR MAGNETIC MEDIA

This is a divisional application of U.S. application Ser. No. 09/477,712, filed Jan. 5, 2000 now abandoned.

Described are glass substrates for magnetic media, for example, hard disk drives. Also described are methods for making such substrates, methods for making a magnetic medium from such substrates and the resulting magnetic media.

BACKGROUND OF THE INVENTION

The potential for use of glass substrates for magnetic media, particularly hard disk drives, has been known for some years. Advantages of a glass substrate over the most currently used aluminum substrates include improved shock resistance and higher stability. For example, the improved shock resistance lessens the possibility of "head slap" damage to the drive which can be a problem with metal substrates and the improved stability results in disks having less flutter when driven at high speeds and/or in thinner disks which still retain adequate stability. Additionally, a glass substrate with a highly smooth surface can provide a disk which can be used with the head closer to the disk, resulting in more data storage.

However, the practical applicability of glass substrates has been hindered by the need for significant processing steps to provide a substrate with suitable surface properties from direct pressings or from glass sheets, i.e., the glass material directly from the apparatus by which it is formed into a sheet. It has been known to prepare sheets of glass by a number of processes, including downdraw, float glass, updraw and rolling methods. As for preparation of glass sheets for use as magnetic media substrates, one type of downdraw method, known as fusion-type downdraw, has been disclosed; see Kitayama, U.S. Pat. No. 5,725,625. However, glass sheets produced by this fusion downdraw method still have insufficient surface properties, i.e., the required flatness, waviness, thickness variation and surface roughness, for direct use in preparing substrates for magnetic media. Thus, as disclosed in Kitayama for example, it was necessary to subject the glass sheet to a significant flattening step. In fact, the Kitayama invention is mainly directed to methods for flattening the glass sheet prepared by the fusion downdraw process. Further, the disks cut from the flattened glass sheet in Kitayama (i.e., the substrate blanks) require significant surface treatment to provide a substrate with sufficient surface properties for use as a magnetic media substrate, particularly a hard disk drive substrate. Thus, in Example 2-1 of Kitayama, the blank cut from the flattened glass sheet still requires a course polishing, a lapping and two additional polishing steps to provide a substrate with adequate surface properties.

Sheets of glass prepared by float glass methods also do not result in an adequate combination of surface properties. Combination of surface properties, and the float glass method has the additional drawback of requiring a processing step of leaching the glass of contaminants inherent in the float glass method and/or of contaminants being left on the glass surface.

All of these additional processing steps require significant time and resources. They also require starting with a glass sheet of sufficient thickness such that, after all the surface treatments which remove material are completed, the resulting magnetic media substrate has the proper thickness. Thus, an expense is added to the method by the necessity of forming a blank of higher thickness, e.g., the expense of melting and processing a greater amount of glass material per substrate blank.

The known methods for providing glass substrates for magnetic media are deficient in failing to provide a practically applicable process wherein a substrate having the required superior surface properties can be cut directly from a glass sheet, as formed, such that little or no surface treatment is required for use in preparing magnetic media, particularly hard disk drives.

SUMMARY OF THE INVENTION

At least in part to overcome the deficiencies in the art, it is an object of this invention to provide substrates for magnetic media, particularly hard disk drives, cut from a glass sheet, as drawn, which require little or no surface treatment. Other objects include methods for preparing such substrates, methods for preparing magnetic media comprising such substrates and the resulting magnetic media products of such processes. Upon further study of the specification and appended claims, further objects and advantages of this invention will become apparent to those skilled in the art.

Accordingly, the invention includes:

A substrate for a magnetic medium prepared from a glass sheet or glass ribbon drawn from a slot downdraw process, particularly wherein the glass sheet has the following properties, as drawn from the slot downdraw process without any subsequent surface treatment:

flatness $\leq 25$ microns, particularly $\leq 10$ microns, waviness less than 100 angstroms, particularly less than 40 angstroms, thickness variation ±20 microns, particularly ±15 microns, and surface roughness, less than 10 angstroms, particularly less than 5 angstroms.

A substrate for a magnetic medium wherein the substrate surface is provided with adequate surface properties solely by touch polishing and cleaning of the glass sheet as drawn from a slot downdraw process.

A substrate as described above which is for a hard disk drive, particularly wherein the substrate is in disk shape and has a magnetic layer thereon.

A method for preparing a glass magnetic media substrate which comprises:

drawing a glass sheet from a slot downdraw process, and cutting said glass magnetic media substrate from the glass sheet.

The above method wherein the substrate has a flatness $\leq 25$ microns, waviness less than 100 angstroms, thickness variation ±20 microns and surface roughness, less than 10 angstroms, prior to any surface treatment subsequent to drawing from the slot downdraw process.

The above method wherein the only treatment which results in removal of glass material from the substrate surface is touch polishing and cleaning, preferably where the touch polishing decreases the total thickness of the substrate by a maximum of 0.02 mm, preferably a maximum of 0.01 mm.

A magnetic medium comprising a glass substrate prepared by a method as described above and a magnetic layer, particularly wherein the magnetic medium is a hard disk drive.

A method for preparing a hard disk drive having a glass substrate which comprises:

drawing a glass sheet from a slot downdraw process,
cutting a disk from the glass sheet,
touch polishing and cleaning the disk, and
applying a magnetic layer to the disk surface.

Glass compositions should be formulated to provide a functionally insignificant alkali interaction between the glass substrate and the magnetic layer(s) of the magnetic media. Examples of useful glass compositions typically contain, on a mole % based on the oxide, 60–75% $SiO_2$, 0–12% $B_2O_3$, 0–17% $Al_2O_3$, 6–13% $Na_2O$, 3–8% $K_2O$, 0–10% ZnO, 0–4% $TiO_2$, 0–5% MgO, 0–10% CaO, and 0–1% BaO. Minor amounts of $As_2O_3$, $Sb_2O_3$ or other processing aids may be incorporated for refining purposes. Specific examples of useful glass materials are described in the following Table 1, together with the material properties thereof.

TABLE 1

Compositions Suitable for the Downdraw Process

| Glasstype Classification | Glass Spec. | Alumino-Silicate | Calcium-Silicate | Zinc-Silicate | Boro-Silicate | Boro-Silicate |
|---|---|---|---|---|---|---|
| Oxide Mole % | | | | | | |
| SiO2 | | 61.7 | 71.46 | 67.13 | 69.77 | 74.44 |
| B2O3 | | | | 0.93 | 7.89 | 10.52 |
| Al2O3 | | 16.8 | 1.31 | 1.78 | 2.69 | |
| Na2O | | 12.2 | 8.07 | 9.07 | 6.75 | 9.05 |
| K2O | | 4.1 | 6.28 | 6.33 | 4.79 | 4.87 |
| ZnO | | | 2.77 | 9.60 | 4.74 | |
| TiO2 | | 0.8 | 0.32 | 0.49 | 3.28 | 0.16 |
| MgO | | 3.7 | | 4.50 | | |
| CaO | | 0.2 | 9.67 | 0.02 | | 0.23 |
| BaO | | | | | | 0.67 |
| As2O3 | | 0.5 | 0.08 | 0.09 | | |
| Sb2O3 | | | 0.04 | 0.06 | 0.09 | 0.07 |
| Properties | | | | | | |
| Chemical Temperability | yes | yes | yes | yes | yes | yes |
| Exp. Coef. ^10-7C-1 | 35–100 | 86 | 96 | 96 | 72 | 83 |
| Youngs Modulus Mpa prior to chem. Tempering | >65 | 73 | 72 | 69 | 73 | 82 |
| Density gm/cm3 | 2.3–2.7 | 2.5 | 2.5 | 2.6 | 2.5 | 2.5 |
| Hardness HK | >500 | 595 | 511 | n/a | 590 | 610 |

The raw material glass used in the slot downdraw process to prepare a glass sheet for use according to the invention can be selected from a wide variety of materials. For use as a substrate for a magnetic medium, however, it is preferred that the glass have the following properties:

a. chemical temperability
b. expansion coefficient from 35 to $100 \times 10^{-7}$ $C^{-1}$
c. Young's modulus prior to tempering of more than 65 Mpa
d. density (g/cm$^3$) of from 2.3 to 2.7
e. hardness of more than 500 HK (Knoops Hardness, as per ISO 9385 procedure)

It is also desirable that the glass possess only small temperature versus viscosity variations within the forming region in order to attain an optimum process achieving desired dimensional characteristics. This is because control of the flow of the glass through the slot during the downdraw must be uniform in order to provide a glass sheet of specified thickness and properties.

Non-limiting examples of useful glass include aluminosilicate, calcium silicate, zinc silicate and borosilicate glasses, the borosilicates being particularly preferred.

Additionally useful glass raw materials include, for example, those described in U.S. Pat. No. 4,148,661, the disclosure of which is incorporated herein by reference.

As discussed in the background section above, fusion downdraw methods were taught in the art (Kitayama) for preparing substrates for magnetic media, however, the fusion downdraw process was deficient in providing a glass sheet of adequate flatness and surface properties. The fusion downdraw process uses a drawing tank with a channel for accepting molten glass raw material where the channel has weirs open at the top along the length of the channel on both sides so that, when the channel fills, the molten glass overflows the weirs and flows by gravity down the outside surfaces of the drawing tank. These outside surfaces extend down and inwardly so that they join at an edge below the drawing tank. The two flowing glass surfaces join at this edge to form a single flowing sheet, i.e., they fuse. The general features of the fusion downdraw process are described, for example, in U.S. Pat. Nos. 3,338,696 and 3,862,609 the disclosures of which are incorporated herein by reference. The references indicate that the advantage of the fusion downdraw method is that since the two films flowing over the channel fuse together, neither outside surface of the resulting sheet comes into contact with any part of the apparatus and, thus, its surface properties are not affected by such contact.

The slot downdraw method, schematically shown in FIG. 1, is distinct from the fusion downdraw method. According to the process, the molten raw material glass (1) is provided to a drawing tank (2) which is heated by resistance heaters (3). The bottom of the drawing tank has an open slot with a nozzle (4) extending the length of the slot. The glass flows through the slot/nozzle and is downdrawn as a sheet (5) therethrough and then through an annealing region (6) by a drawing machine into a continuous sheet. Compared to the fusion downdraw process, the slot downdraw process has the advantage of providing a thinner sheet of glass having the desired properties because only a single sheet is drawn through the slot rather than two sheets being fused by the fusion downdraw process. In particular, the slot downdraw process advantageously provides a substrate with a thickness of from 0.03 to 1.9 mm, although a thickness of from 0.8 to 1.1 mm is preferably applicable for hard disk drive substrates. Applicants have discovered that, although the glass obviously contacts the sides of the slot/nozzle, the process will provide a glass sheet of excellent surface properties for magnetic media substrate use.

To obtain a suitable substrate according to the invention, the slot downdraw process must include tight control over the viscosity of the glass during the different phases of the sheet formation; see the schematic of FIG. 2. Thus, the ability to form a sheet and provide the desired surface properties is affected by the viscosity of the glass melt provided in the drawing tank, the viscosity of the glass where sheet forming takes place in the range between the forming point and the softening point of the glass and especially of the viscosity during annealing.

It has been discovered that the slot downdraw process for preparing flat panel display substrates as described by D. Boettger, Glass Technology International, Year IX, no. 4 (July–August 1998), provides useful teachings for preparing a glass sheet useful for magnetic media substrates according to the invention; it is, thus, incorporated herein by reference. Boettger teaches the desirability of providing the molten and refined glass as uniform as possible and fully mixed to the drawing tank. Means for such are exemplified in Boettger, for example, by using the platinum or platinum alloy technology described therein.

Also as discussed in Boettger, the geometry characteristics of both the drawing tank and the nozzle for the slot will affect the uniformity of the drawn product. The geometry and height of the nozzle are provided such that uniform glass thickness over the whole width of the nozzle and thus in the resulting glass sheet is achieved. The corner areas of the slot and nozzle are particularly important. If the corner areas are too wide, the out-flowing glass melt is too hot and will flow faster than the melt towards the center of the slot/nozzle. If the corner areas are too narrow, the out-flowing glass melt will cool too fast and flow slower than the melt towards the center. In either of these events, stresses will occur in the glass which will distort its properties.

Further, the viscosity can be affected by heating. Thus, both the drawing tank and the nozzle are preferably capable of being adjustably heated in different zones, preferably by direct resistance heating.

It is also of importance to control the temperature of the drawn glass sheet after it leaves the nozzle. After leaving the nozzle, different forces influence the conformity of the glass sheet, e.g., the downwards directed tensile force generated by the drawing machine, earth's gravity and the surface tension. Thus, it is preferable to have a pre-annealing temperature adjustment of the glass sheet after it leaves the nozzle. Subsequently, the more conventional annealing step can be conducted. The annealer is necessary to quickly cool the glass sheet in a controlled and uniform manner. Additionally, the viscosity of the drawn glass sheet has to be increased such that it holds its desired shape despite the above-discussed forces being applied to it. The drawing machine used can be from those conventionally known for thin sheet applications.

According to invention, a glass sheet is obtained directly from the above-described slot downdraw process which has superior surface properties, preferably:

flatness $\leqq 25$ microns, particularly $\leqq 10$ microns, waviness less than 100 angstroms, particularly less than 40 angstroms, thickness variation $\pm 20$ microns, particularly $\pm 15$ microns, and surface roughness, less than 10 angstroms, particularly less than 5 angstroms.

These values are determinable according to known methods, such as standards for measuring surface properties of flat panel display substrates, as described in SEMI D15-1296 by SEMI (1996). The basis for the flatness, waviness and roughness properties is demonstrated in FIG. 3 wherein it seen that the actual traced profile has components of flatness (i.e., variation over the whole scale of the surface), waviness (i.e., variation from complete smoothness on an intermediate scale) and surface roughness (i.e., variation from complete smoothness on the smallest scale).

With properties within the values described above, the glass sheet can be cut into blanks suitable for magnetic media with little or no surface treatment. For instance, the glass sheet can provide a blank for magnetic media which only requires touch polishing and cleaning before application of a magnetic layer. Because the glass sheet already has superior surface properties from the downdraw process, additional surface treatment steps can be avoided, e.g., flattening, grinding, lapping (sand blasting) and/or heavy polishing steps. Thereby, a great savings in time and elimination of additional apparatus is achieved. This is particularly advantageous to magnetic media manufacturers who purchase blanks and prepare magnetic media, particularly hard disk drives, therefrom. Further, there is a savings associated with not having to form as thick of an initial glass sheet because less material is removed by the above-mentioned surface treating steps to form the final product.

The invention provides advantageous economies in the method of preparing glass magnetic media substrates. As discussed, the known glass substrates were prepared by processes involving forming a glass sheet and subjecting the glass sheet to various flattening and surface modifying steps to provide a substrate with adequate properties for magnetic media. Substrates prepared according to applicants' invention do not require flattening and/or heavy surface treatment.

As stated above, blanks for magnetic media can be prepared from the glass sheet as drawn from the downdraw process with little or no further surface treatment. The blanks are prepared from the glass sheet by steps known in the art. For example, the glass sheet is cut into uniformly sized sheets which are stacked together with an interleaving layer between each sheet, preferably adhered to each sheet. The stacks of glass sheets with interleaving layers are then drilled to cut the outside diameter of the disk and the inside diameter of the center hole of the disk. Each sheet can provide multiple disks which number of disks is multiplied by the number of sheets in the stack to provide the total number of disks provided per one operation of drilling a stack. Alternative to drilling, disks may be laser cut from individual sheets to prefinished dimensions. The invention is preferably applied to making disks of any size currently popular in the industry. Current popular sizes include what are termed disks for 5.25, 3.5, 3.0, 2.5 and 1.8 inch drives. The actual dimensions of the disks for such drives are as follows: 5.25 (OD 130 mm, ID 40 mm), 3.5 (OD 95 mm, ID 25 mm), 3.0 (OD 84 mm, ID 25 mm), 2.5 (OD 65 mm, ID 20 mm) and 1.8 (OD 48 mm, ID 12 mm). However, the invention is not limited thereby if different sizing is required. After drilling, the disks are provided in cylinder stacks with the adhesive interleaving layer holding the cylinder stack of multiple disks together. The inside diameter and edges and outside diameter edges are preferably then polished while being maintained in the cylinder stack and then cleaned to remove polishing compound. The resulting cylinder stacks of blanks are ready in this form to ship to customers and provide the distinct advantage that the customer need only separate the blanks from the cylinder stacks and subject them merely to touch polishing and cleaning to provide a substrate for application of a magnetic layer to prepare a magnetic medium, particularly a hard disk drive.

The touch polishing can be conducted by known methods. Preferred are the known methods for chemical-mechanical polishing (CMP) using a cerium oxide aqueous slurry polishing compound with de-ionized water under pressure applied by a plastic (e.g., polyvinyl alcohol) pad. The touch polishing or kiss polishing results in only minimal material removal, preferably a reduction in total thickness of the disk of 0.02 mm, preferably 0.01 mm, at most. For example, a disk of 1.0 mm thick can be provided by touch polishing of a 1.01 mm thick blank to remove only 0.01 mm thickness of material from the blank surface.

Either before or after the touch polishing is conducted, it is preferable to subject the blanks to chemical tempering for strengthening. The tempering is conducted by known methods, for example, by treating the heated blanks with a heated solution containing ions of a larger ionic radius to replace ions in the glass surface. For instance, the tempering solution may contain sodium and potassium ions which will replace, respectively, lithium and sodium ions at the surface of the glass, thus, placing the surface in compression.

The blanks, preferably chemically tempered, touch polished and cleaned, are suitable substrates for application of a magnetic layer to provide a magnetic medium, particularly a hard disk drive. The magnetic layer can be provided, for example, by known methods. For instance, this is typically accomplished by sputtering of one or more magnetic layers, optionally after sputtering of one or more underlayers, and a protective layer over top of the magnetic layer(s). Glass substrates provide an additional advantage over aluminum substrates here because glass can accommodate a higher range of temperatures without losing its shape. Thus, a greater flexibility is provided to use sputtering steps which may require greater temperatures.

The invention thus provides a more economical process for preparing glass substrates for magnetic media which avoids disadvantages encountered in the art. Particularly, the invention provides a method for preparing glass magnetic media substrates which require significantly less processing subsequent to drawing of the glass sheet to prepare magnetic media. Also, the invention provides the glass substrates prepared by this process, and magnetic media based on such substrates, which have advantages over the previous glass magnetic media substrates and media therefrom because the substrates are not subject to the subsequent processing steps which may affect their properties.

Figure 1:
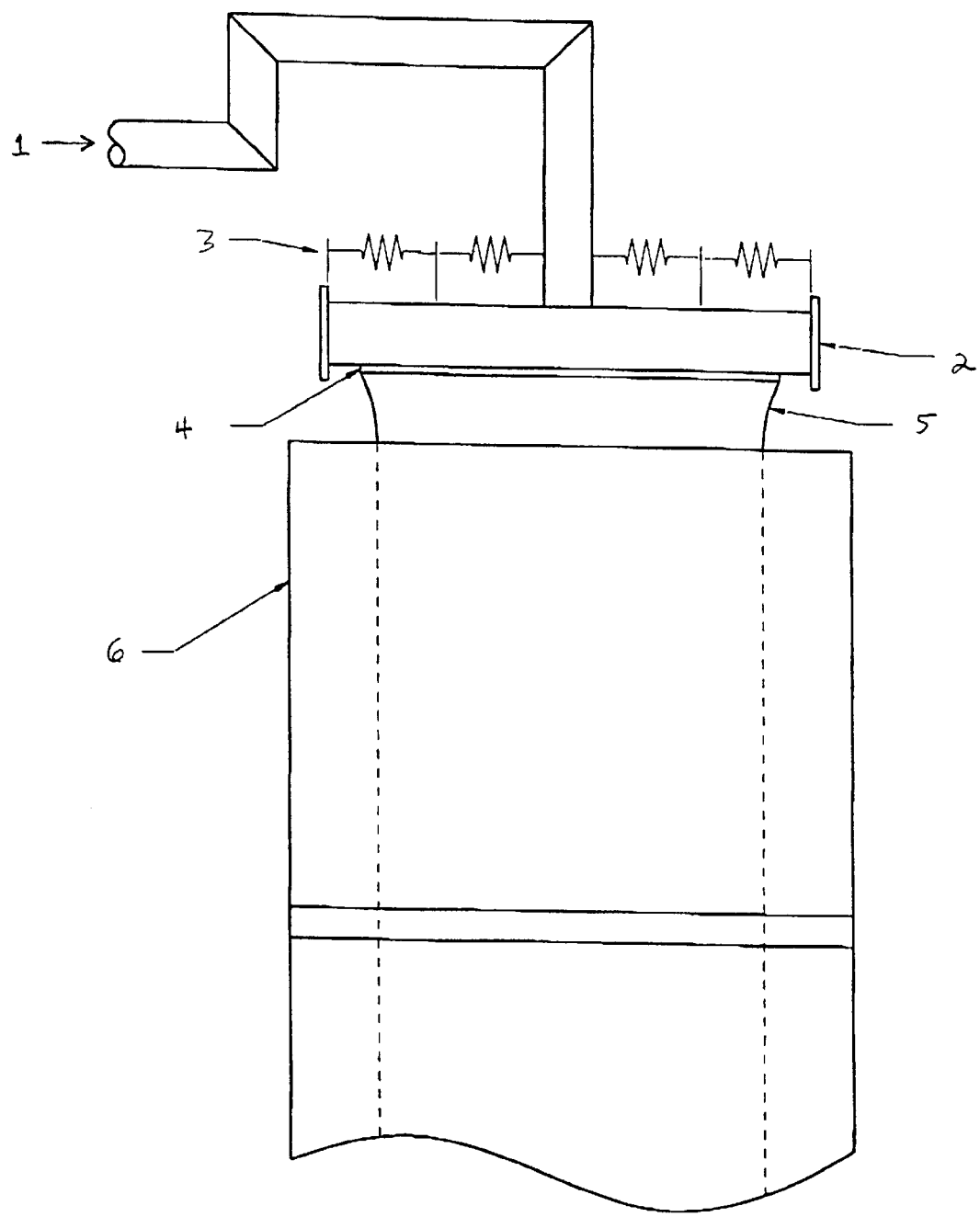
FIG. 1 shows a schematic of the slot downdraw method of the invention.
Figure 2:
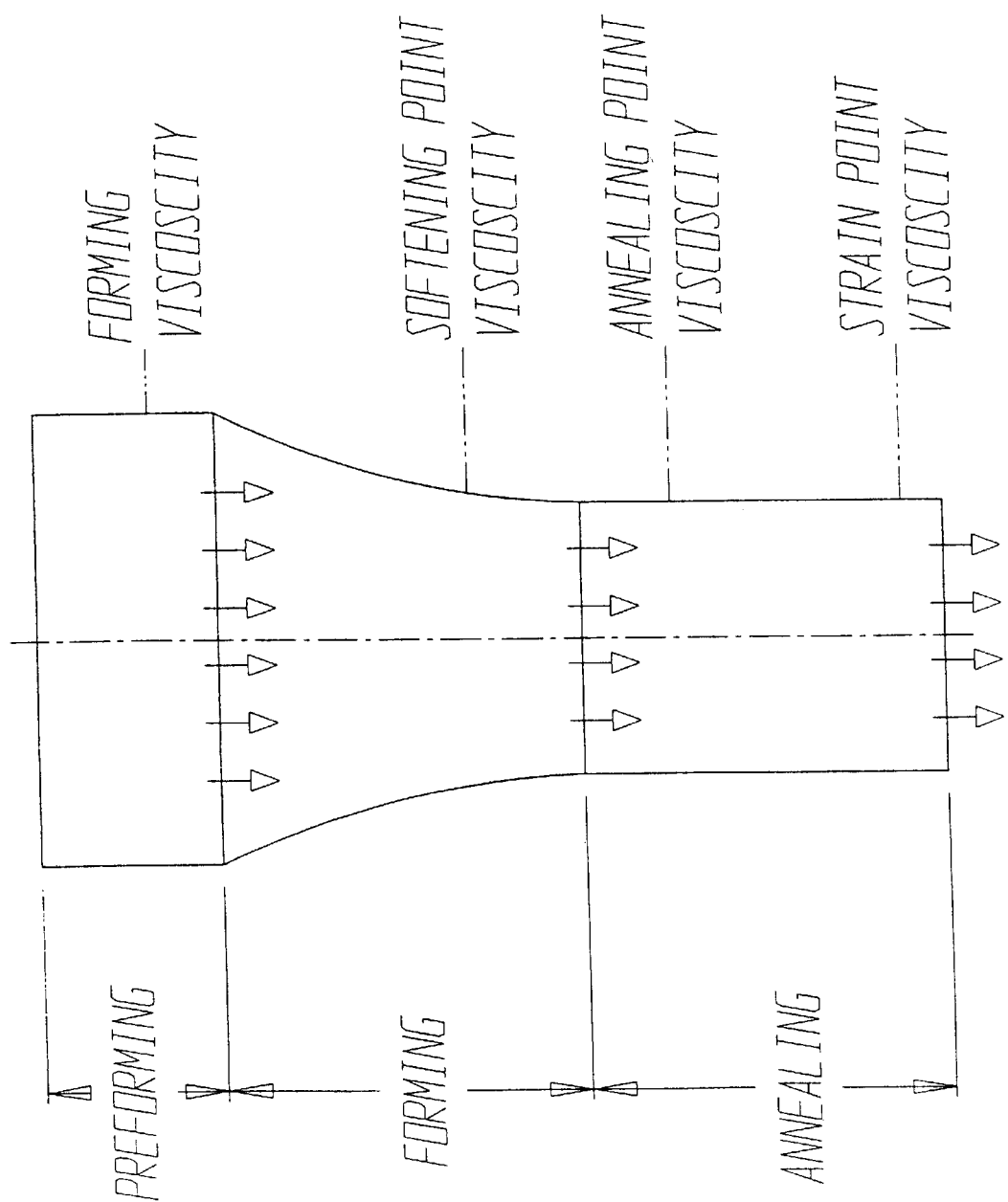
FIG. 2 shows a schematic of the manner of controlling viscosity of the glass during sheet formation.
Figure 3:
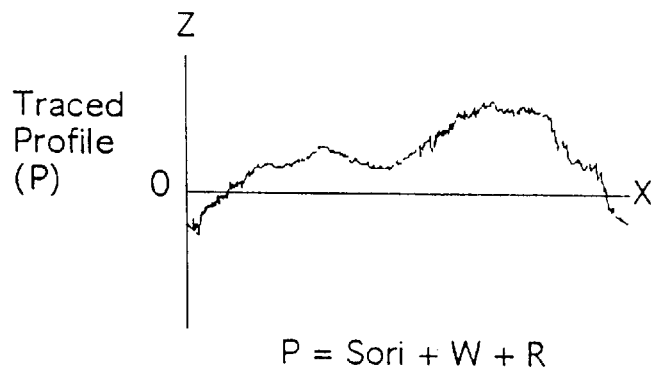
FIG. 3 are graphs showing the basis for determining the flatness properties used in describing the invention.
Figure 3:
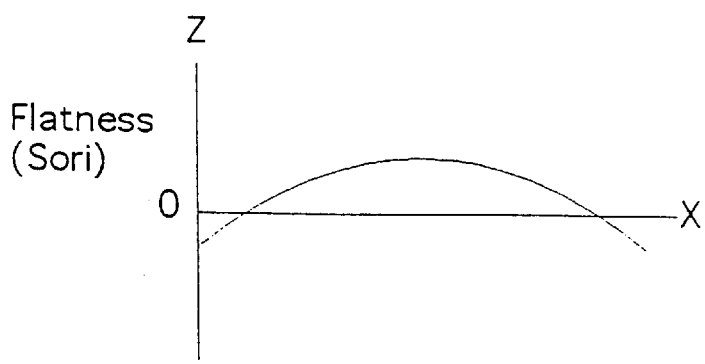
Figure 3:
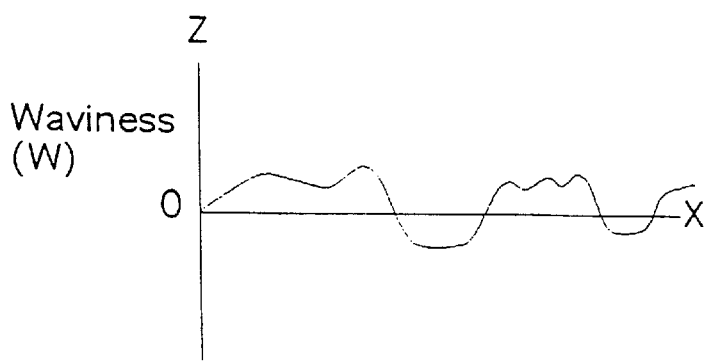
Figure 3:
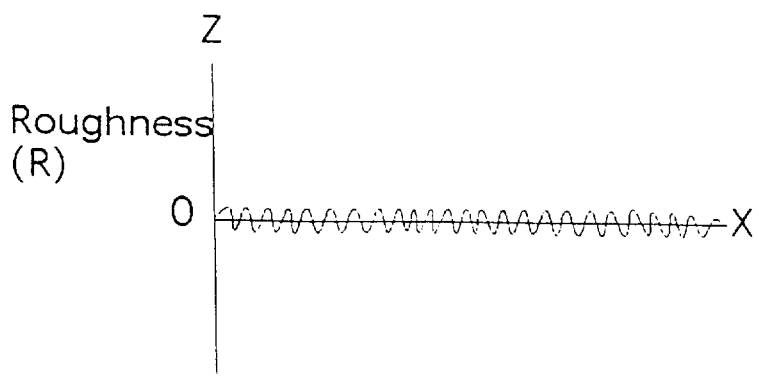

The entire disclosure of all applications, patents and publications, cited above and below, is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

We claim:

1. A method for preparing a glass magnetic media substrate which comprises:

drawing a glass sheet from a slot downdraw process, and cutting said glass magnetic media substrate from the glass sheet, wherein the method includes no lapping, grinding or heavy polishing steps which remove glass material from the substrate surface.

2. The method of claim 1, wherein the substrate has the following properties prior to any surface treatment subsequent to drawing from the slot downdraw process:

flatness $\leq 25$ microns, waviness less than 100 angstroms, thickness variation ±20 microns, and surface roughness, less than 10 angstroms.

3. The method of claim 1, wherein the substrate has the following properties prior to any surface treatment subsequent to drawing from the slot downdraw process:

flatness $\leq 10$ microns, waviness less than 40 angstroms, thickness variation ±15 microns, and surface roughness, less than 5 angstroms.

4. The method of claim 1, further comprising touch polishing and cleaning.

5. The method of claim 4, wherein the touch polishing decreases the thickness of the substrate by a maximum of 0.02 mm.

6. The method of claim 4, wherein the touch polishing decreases the thickness of the substrate by a maximum of 0.01 mm.

7. The method of claim 1, wherein the glass magnetic media substrate is cut from the glass sheet in the form of a disk suitable as a substrate in a disk for a hard disk drive.

8. The method of claim 1, wherein a plurality of sheets of glass are arranged as a stack together with an adhesive interleaving layer in between each sheet and a plurality of substrates are cut from the stack in a single cutting step.

9. The method of claim 1, wherein the glass magnetic media substrate has a thickness from 0.8 to 1.1 mm.

10. The method of claim 1, wherein the glass magnetic media substrate has a thickness from 0.03 to 1.9 mm.

11. A magnetic medium comprising a glass substrate prepared by the method of claim 1 and a magnetic layer thereon.

12. A magnetic medium comprising a glass substrate prepared by the method of claim 4 and a magnetic layer thereon.

13. The magnetic medium of claim 11, wherein the magnetic medium is in the form of a disk for a hard disk drive.

14. A method for preparing a disk for a hard disk drive, the disk having a glass substrate, which comprises:

drawing a glass sheet from a slot downdraw process,
cutting a disk from the glass sheet,
touch polishing and cleaning the disk, and
applying a magnetic layer to the disk surface,
wherein the method includes no lapping, grinding or heavy polishing steps which remove glass material from the substrate surface.

15. The method of claim 11, wherein the touch polishing decreases the thickness of the disk by a maximum of 0.02 mm.

16. The method of claim 11, wherein the touch polishing decreases the thickness of the disk by a maximum of 0.01 mm.

* * * * *